(12) United States Patent
Goode (10) Patent No.: US 8,538,003 B2
(45) Date of Patent: Sep. 17, 2013

(54) METHOD AND APPARATUS FOR INTEGRATING CALL CENTER AND EXISTING TELEPHONY INFRASTRUCTURE

(75) Inventor: Karl G. Goode, Cheshire, CT (US)

(73) Assignee: Hartford Fire Insurance Company, Hartford, CT (US)

(*) Notice: Subject to any disclaimer, the term of this patent is extended or adjusted under 35 U.S.C. 154(b) by 894 days.

(21) Appl. No.: 12/557,132

(22) Filed: Sep. 10, 2009

(65) Prior Publication Data

US 2010/0067683 A1 Mar. 18, 2010

Related U.S. Application Data

(60) Provisional application No. 61/096,562, filed on Sep. 12, 2008.

(51) Int. Cl.
*H04M 7/00* (2006.01)
*H04M 3/42* (2006.01)
*H04L 12/66* (2006.01)
*H04L 12/28* (2006.01)

(52) U.S. Cl.
USPC ............ 379/220.01; 379/211.02; 379/212.01; 379/219; 379/221.01; 370/351; 370/352

(58) Field of Classification Search
USPC .......... 379/220.01, 265.12, 231, 219, 221.01, 379/212.01, 211.02, 265.11, 265.13; 370/331, 370/352, 351
See application file for complete search history.

(56) References Cited

U.S. PATENT DOCUMENTS

| 6,697,858 | B1 | 2/2004 | Ezerzer et al. |
|---|---|---|---|
| 6,937,597 | B1 | 8/2005 | Rosenberg et al. |
| 7,403,607 | B2* | 7/2008 | Hession et al. .......... 379/265.12 |
| 7,418,092 | B2 | 8/2008 | Brown |
| 7,599,351 | B2 | 10/2009 | Gallant et al. |
| 7,668,303 | B2 | 2/2010 | Peters et al. |
| 2005/0141689 | A1 | 6/2005 | Wengrovitz |
| 2005/0180436 | A1 | 8/2005 | Hsu |
| 2006/0221941 | A1* | 10/2006 | Kishinsky et al. ............ 370/352 |
| 2007/0092073 | A1 | 4/2007 | Olshansky et al. |
| 2009/0022103 | A1* | 1/2009 | Shatsky ....................... 370/331 |

OTHER PUBLICATIONS

J. Rosenberg et al., "SIP: Session Initiation Protocol", Network Working Group, Request for Comments: 3261, Obsoletes: 2543, Category: Standards Track, Jun. 2002, retrieved date : Oct. 14, 2010, download from Internet: http://www.ietf.org/rfc/rfc3261.txt?number=3261, 247pgs.

* cited by examiner

*Primary Examiner* — Thjuan K Addy
(74) *Attorney, Agent, or Firm* — Howard IP Law Group, PC (57) ABSTRACT

A system, method, apparatus, means, and computer program code is provided for routing a call which includes receiving a call request at a first server, the call request including header data identifying a requesting extension and an invited extension, the invited extension associated with a second server. The header data identifying an invited extension is then replaced with proxy data for the invited extension, and the call request (including header data identifying the requesting extension and the proxy data for the invited extension) is forwarded to a second server.

20 Claims, 5 Drawing Sheets

METHOD AND APPARATUS FOR INTEGRATING CALL CENTER AND EXISTING TELEPHONY INFRASTRUCTURE

RELATED APPLICATION

This application is based on and claims benefit of and priority to U.S. Patent Application Ser. No. 61/096,562 filed on Sep. 12, 2008, the contents of which are hereby incorporated by reference herein in their entirety for all purposes.

FIELD OF THE INVENTION

The present invention relates to telecommunications systems. More particularly, embodiments relate to methods and apparatus for integrating Internet telephony and existing telephony infrastructures.

BACKGROUND

The number of businesses using Internet telephony (referred to herein generally as "VoIP") continues to increase, thanks to the flexibility and cost savings the technology provides. However, large numbers of businesses continue to rely on PBX systems for many of their telephony needs.

As businesses evolve through acquisition or other growth, they are often faced with the problem of integrating different telephony systems. For example, businesses are commonly faced with the problem of integrating a VoIP system (e.g., such as one used by a call center) with a PBX-based system (e.g., such as one used by a business' back office). Unless the PBX system is specifically designed to integrate with a VoIP system, the integration can provide undesirable loss of calling features. For example, it may not be possible to transfer calls from extensions at the VoIP system to extensions at the PBX system, or to conference back-office workers into active calls in the VoIP system. The loss or inability to readily provide these features can dramatically reduce the ability of a business to perform important business functions.

It would be advantageous to provide a method and apparatus that overcame the drawbacks of the prior art. In particular, it would be desirable to provide a method and apparatus for integrating Internet telephony with PBX telephony. More particularly, it would be desirable to provide a method and apparatus for transferring a call in a network which consists of both a PBX and an Internet telephony system.

BRIEF DESCRIPTION OF THE DRAWINGS

The accompanying drawings, which are incorporated in and form a part of the specification, illustrate the embodiments, and together with the descriptions serve to explain the principles of the invention.

DETAILED DESCRIPTION

Applicant has recognized that there is a need for systems, methods, means and computer code that facilitate the integration of Internet telephony systems with PBX systems. As a result, in some embodiments a call is routed in a network by first receiving a call request at a first server, the call request including header data identifying a requesting extension and an invited extension, the invited extension associated with a second server. The header data identifying an invited extension is then replaced with proxy data for the invited extension, and the call request (including header data identifying the requesting extension and the proxy data for the invited extension) is forwarded to a second server.

By replacing the header data in such a manner, embodiments allow calls to be transferred or routed from an Internet telephony system (such as a VoIP system) to a PBX system without loss of call features or data. In this manner, personnel using a VoIP system can readily interact and seek call support from personnel using a PBX system. These and other features will be discussed in further detail below, by describing a system, individual devices, and processes according to embodiments of the invention.

For convenience and ease of exposition, a number of terms are used herein. For example, the term Voice over Internet Protocol or "VoIP" refers to voice or voice messaging transported over the internet rather than the public switched telephone network ("PSTN"). As used herein, VoIP communications are implemented using session protocols such as those defined in the "Session Initiation Protocol" (or "SIP") which is defined in RFC-3261, "SIP: Session Initiation Protocol" which is hereby incorporated by reference for all purposes. As used herein, a "IP PBX" or "SIP Server" is a type of PBX that connects to one or more client stations (or telephone handsets) on the private side by an IP network and to a Internet Telephone Service Provider ("ITSP") on the public side via an IP network (e.g., such as the Internet). As used herein, the term "SIP Trunk" refers to a logical connection between the SIP Server and an ITSP and other devices in communication with the SIP Server.

As used herein, the term "extensions" are used to refer to individual endpoints configured to place and receive calls. An extension may be associated with a terminal device (e.g., such as a telephone), referred to herein as "stations".

The term "PBX" is used herein to refer to a private branch exchange. When referred to as an "IP PBX", the term refers to a private branch exchange configured to operate using the SIP protocols. When referred to simply as a "PBX", the term is used to refer to a private branch exchange configured to route calls to a number of stations and to the public switched telephone network (or "PSTN").

To illustrate features of some embodiments, an example environment will now be introduced. This illustrative example will be referenced throughout the remainder of the disclosure. Those skilled in the art will appreciate that the example is illustrative and not limiting—features of embodiments of the present invention can be used to achieve desirable results in other environments.

In the illustrative example, an entity (such as a company) operates a back office support center with a number of skilled call center agents or managers. The back office support center uses a conventional PBX to receive, route and place calls over the PSTN and other networks.

As part of the expansion of the company's business, the company acquires or otherwise associates with a remote call center. The remote call center is staffed by a number of front line sales agents. The remote call center uses an IP PBX to route and place calls over a variety of networks, including the Internet and the PSTN. The company wishes to integrate the telecommunications systems of the back office support center and the remote call center so that front line sales agents can transfer or otherwise connect callers to stations manned by agents in the back office support center. Further, the company wishes to perform the integration without replacing either the conventional PBX or the IP PBX.

Pursuant to some embodiments, the integration can be performed without need to replace the conventional PBX or the IP PBX, allowing a clean and consistent integration between the two centers. Features of some embodiments will now be described by first referring to FIG. 1, where a system 100 pursuant to some embodiments is shown.

As shown, several site locations are depicted as items 102, 106 and 152. These site locations may be geographically or physically remote from each other and may be, for example, a back office center 102, a network operations center 106 and a remote call center 152 (although those skilled in the art will appreciate that other locations and functions may be represented and that some or all of the locations may be collocated, etc.). In the site configuration shown in FIG. 1, the back office center 102 utilizes a traditional PBX 104 to manage, route and control voice calls. PBX 104 is in communication with a number of stations 112, 114 as well as a voice mail server 110. PBX 104 may be any of a number of traditional PBX devices, such as, for example, a PBX offered by Avaya or the like. In some embodiments, the voice mail server 110 may be accessed and used for the voice mail requirements of the remote call center 152 stations as well as the voice mail requirements of the back office center 102. In this manner, legal and other regulatory requirements (e.g., such as those for document retention, etc.) may be complied with by the back office center 102. In some embodiments, phantom voicemail boxes are established to store voice mail for stations 158, 160 of the remote call center 152.

Figure 1:
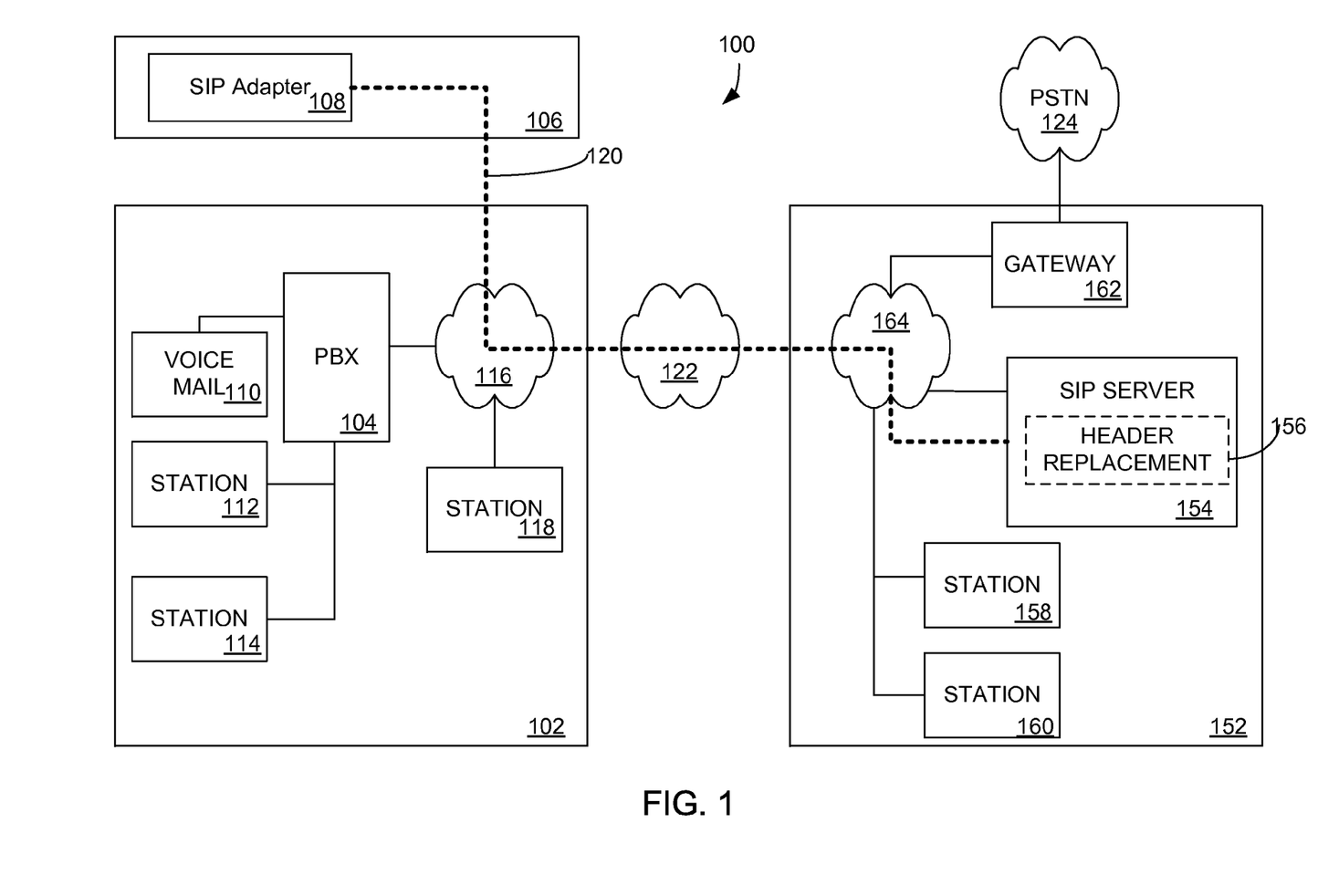
FIG. 1 is a block diagram of system components pursuant to some embodiments.

The network operations center 106 utilizes a SIP Adapter 108 which is used to adapt PBX 104 to receive and transmit messages using the SIP protocol, and is in communication with PBX 104 via a SIP trunk 120. The SIP trunk 120 may uses the SIP network signaling protocols to control signaling and session initiation between applications and/or devices in the system 100. For example, in an embodiment where the PBX 104 is an Avaya PBX, the SIP Adapter 108 may be an Avaya SIP enablement server. In some embodiments, redundant SIP enablement servers may be used to ensure a redundant, highly available system.

The remote call center 152 utilizes a SIP server 154 to operate as an IP PBX. Remote call center 152 includes a number of stations 158, 160 which can communicate, using the SIP protocol, with each other and with external stations, including stations associated with the back office center 102 and external stations over the PTSN 124. As an example, the SIP server 154 may be a Genesys SIP server.

Communication between the back office center 102 and the remote call center 152 may be over the SIP trunk 120 which is established over MPLS drops to allow incoming and outgoing digit conversion and dialing between the two centers. In some embodiments, the SIP trunk 120 is configured to create tie lines that allow 5 or 7 digit dialing over a private network 122. In this manner, a private telephony network is created that avoids any additional long distance charges that may be incurred if long distance dialing were used for back office call delivery.

Referring to the illustrative example introduced above, a company owning or controlling the back office center 102 and the remote call center 152 wishes to integrate the two centers such that agents operating stations 158, 160 at the remote call center 152 can transfer or otherwise pass calls from the remote call center 152 to the back office center 102 (e.g., to a station such as station 118 at the back office center 102). For example, it may be desirable to allow agents at the remote call center 152 to reach back office workers while servicing customers or addressing administrative needs. It may also be desirable to conference back-office workers into active customer and agent calls in the remote call center 152. It may further be desirable to transfer agent and customer calls to back office workers (for example, staffing stations 112, 114 or 118). As discussed above, many traditional PBX systems do not allow such integration without significant customization.

Pursuant to some embodiments, the integration may be accomplished by providing a header replacement module 156 in SIP Server 154. Those skilled in the art will appreciate that SIP Server 154 may include (or be) a web server used to provide an administration web page or console that is used by administrators to configure the various parameters of the SIP Server 154. Pursuant to some embodiments, the configuration web page includes a number of options which allow certain messaging headers to be replaced when certain rules are met. Embodiments of the present invention modify certain messaging headers to ensure that call data can be routed from stations registered with the SIP Server 154 (such as stations 158, 160) to stations associated with the PBX 104 (such as stations 112, 114). Since the SIP protocol is used to route calls from the SIP server 154, the call data is passed through the SIP trunk 120 to the SIP adapter 108. If header data were not modified, call data transferred from the SIP Server 154 to the SIP adapter 108 could not be appropriately responded to by the PBX. As a result, without the header modification of the present invention, call data passed from station 158 to station 114 could not be replied to, resulting in a loss of functionality that could impair a business' ability to properly service calls. For example, without the header modification of the present invention, an "invalid domain" or other error message would be generated, preventing call data to be passed as desired.

Pursuant to some embodiments, the header replacement module 156 stores a number of configuration rules which define how certain message headers are to be modified. In particular, the SIP protocol defines the message type "INVITE". Pursuant to some embodiments, any INVITE messages which are addressed to an extension associated with a station in the back office center 102 will be replaced with a proxy address associated with the SIP adapter 108 thereby allowing call data to be passed from an extension associated with a station of the remote call center 152 to an extension associated with a station of the back office center 102. In some embodiments, a number of different replacement rules may be specified so that call data is passed to stations at the back office center 102.

Figure 4A:
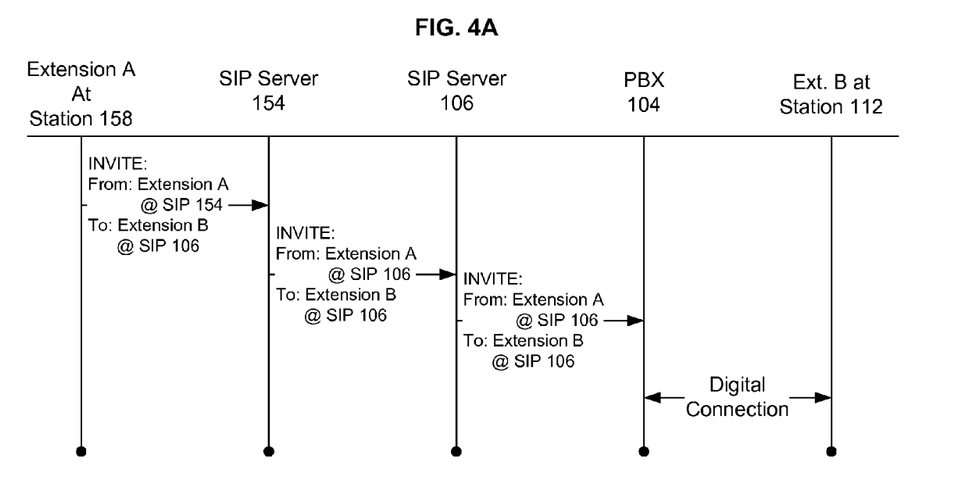
FIG. 4 is a call flow diagram pursuant to some embodiments.

An example of a header modification pursuant to the present invention will now be described by reference to FIG. 4A, where a call flow diagram 400 is shown. In the call flow diagram 400, a SIP INVITE message is generated by an extension "A" at station 158. Pursuant to the SIP protocol, an INVITE message specifies a "FROM" address and a "TO" address. In the call flow diagram 400, the FROM address is: "extension_A@SIP_158" (i.e., the FROM address is the address associated with the extension registered as extension "A" at SIP server 158). In the call flow diagram 400, the TO address is: "extension B@SIP_158" (i.e., the TO address is the address associated with the extension registered as extension "B" at SIP Server 108). Pursuant to embodiments of the present invention, the extension registered as "B" is an extension associated with the PBX 104 of the back office center 102.

The INVITE message (with the above specified FROM and TO addresses) is passed from the station 158 to the SIP Server 156. Upon receipt of the INVITE message, the SIP Server 156 identifies the message as an "INVITE" message and consults with the configuration information regarding header replacement to identify the FROM address and the TO address as ones requiring header replacement. The FROM address, as a result, is modified to replace the original FROM address with a replacement FROM address: "extension_A@SIP_108". That is, the INVITE message is modified so that it appears as if the INVITE is FROM the SIP Adapter 108 associated with the PBX 104. The TO address remains unchanged, and the message is delivered (over the SIP trunk 120) to the appropriate station—the station registered as station "B" of the back office center 102. Once station B has received the INVITE message, a digital connection is established between the two extensions: extension A of remote call center 152 and extension B of back office center 102.

Similar header replacements can be used to allow connections between a wide variety of stations and extensions at centers 102 and 152. For example, similar header replacements can be used to allow stations of remote call center 152 to utilize the voice mail system 110 of back office center 102.

Figure 4B:
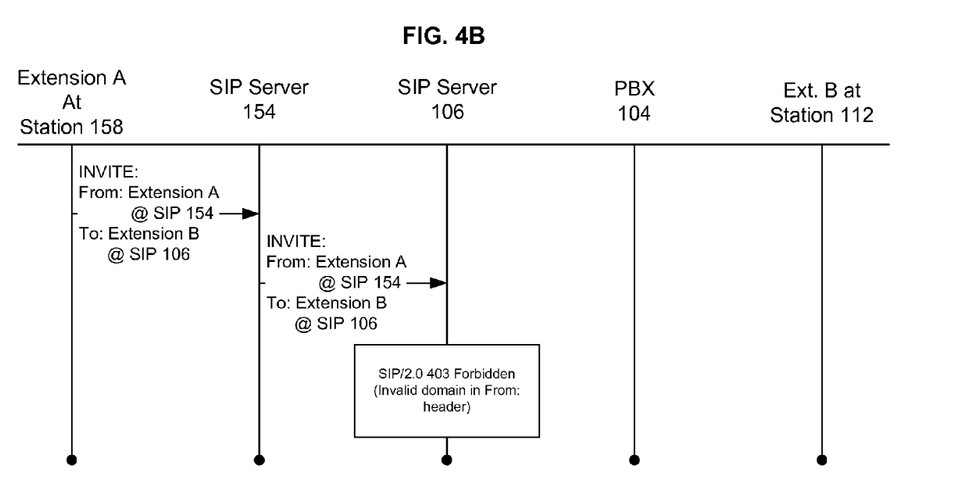

If features of the present invention were not used, an error would result as shown in the call flow diagram 402 of FIG. 4B. As shown in FIG. 4B, no header replacement module 156 is provided, and no header replacement is performed. The result is a SIP error message as the FROM header received at SIP server 106 is an unknown address.

Figure 2:
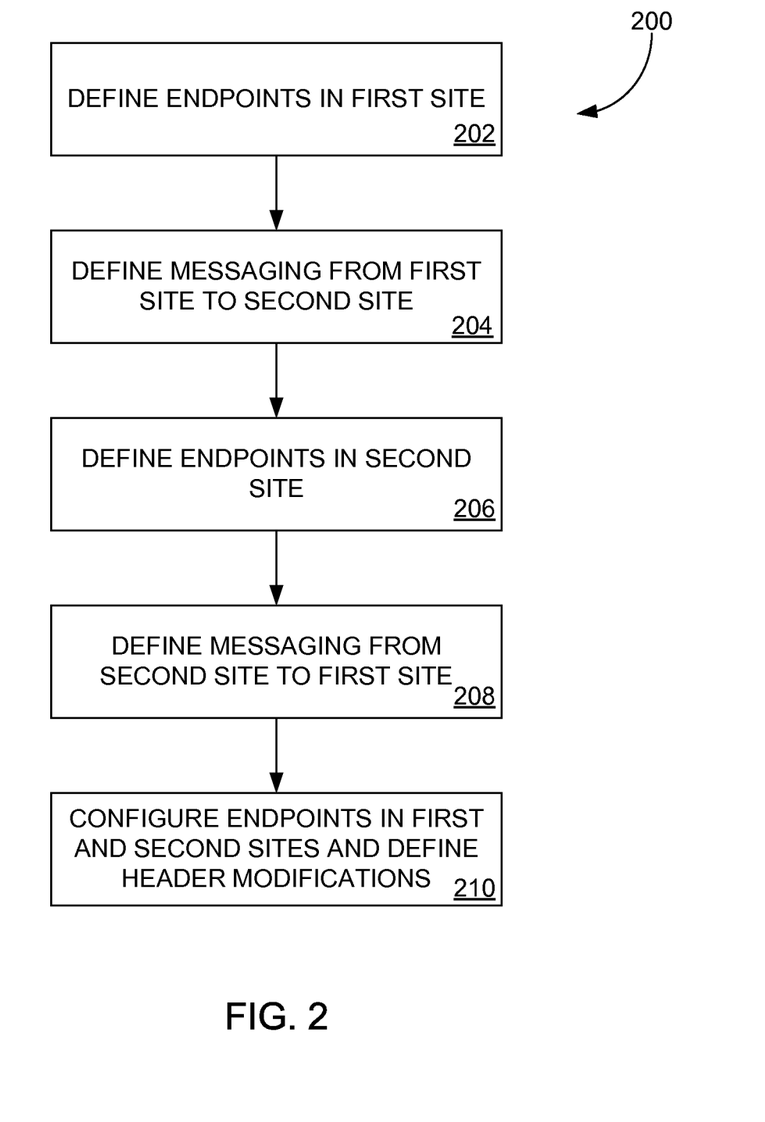
FIG. 2 is a flowchart of an integration method pursuant to some embodiments.

Reference is now made to FIG. 2, where a flow chart 200 is shown which depicts a method for integrating call centers (e.g., such as the back office center 102 and the remote call center 152 of FIG. 1). The particular arrangement of elements in the flow chart 200 is not meant to imply a fixed order to the elements; embodiments can be practiced in any order that is practicable. In some embodiments, some or all of the elements of the method 200 may be performed or completed by or at one or more SIP servers such as the servers 156 and 106.

Processing begins at 202 where one or more endpoints at a first site are defined. For example, referring to the system of FIG. 1, processing at 202 may include defining endpoints (or extensions) associated with the stations in the remote call center 152. These endpoints may be specified by interacting with the SIP server 154, e.g., via an administrative web page. Each endpoint may be associated with a numeric identifier or extension, which will be registered with the SIP server 154 (and associated with one or more stations). Processing at 202 may be repeated a number of times until a range of endpoints have been defined.

Processing continues at 204 where messaging rules are defined for communicating between a first site and a second site. For example, referring to the system of FIG. 1, processing at 202 may include defining messaging rules to allow communication between center 152 and 102. These definitions may be established by an administrator interacting with SIP server 154 via an administrative web page. The messaging definitions may include the definition of configuration details including details identifying: the DTMF payload type, gateway objects, switch settings, network regions, signaling groups and the like as are known to those skilled in the art.

Processing continues at 206 where one or more endpoints at a second site are defined. For example, referring to the system of FIG. 1, processing at 206 may include defining endpoints (or extensions) associated with the stations in the back office center 102. These endpoints may be specified by interacting with the SIP adapter 108, e.g., via an administrative web page. Each endpoint may be associated with a numeric identifier or extension, which will be registered with the SIP adapter 108 (and associated with one or more stations). Processing at 206 may be repeated a number of times until a range of endpoints have been defined.

Processing continues at 208 where messaging rules are defined for communicating between the second site and the first site. For example, referring to the system of FIG. 1, processing at 208 may include defining messaging rules to allow communication between center 102 and center 152. These definitions may be established by an administrator interacting with SIP adapter 108 via an administrative web page. The messaging definitions may include the definition of configuration details including details identifying: the DTMF payload type, gateway objects, switch settings, network regions, signaling groups and the like as are known to those skilled in the art.

Processing continues at 210 where an administrator or other user interacts with SIP Server 154 to configure endpoints in the first and second sites and to define one or more header modifications to be applied. Each endpoint corresponds, for example, to a station or extension at either the back office center 102, or the remote call center 152 of FIG. 1. For certain endpoints, a header modification may also be specified. For example, the result of processing at 210 may be a table or database of endpoints as well as any associated header modifications that need to be applied to messages directed to (or from) those endpoints. For examples of endpoint addresses and header modifications, see the illustrative example shown in FIG. 4A discussed above.

Upon completion of process 200, each of the endpoints, messaging rules, and header modification rules are completed, and the system is ready for calls to be transferred and routed pursuant to the present invention. Those skilled in the art will appreciate that the exact steps for implementing the process 200 may depend on the call center hardware being utilized.

Figure 3:
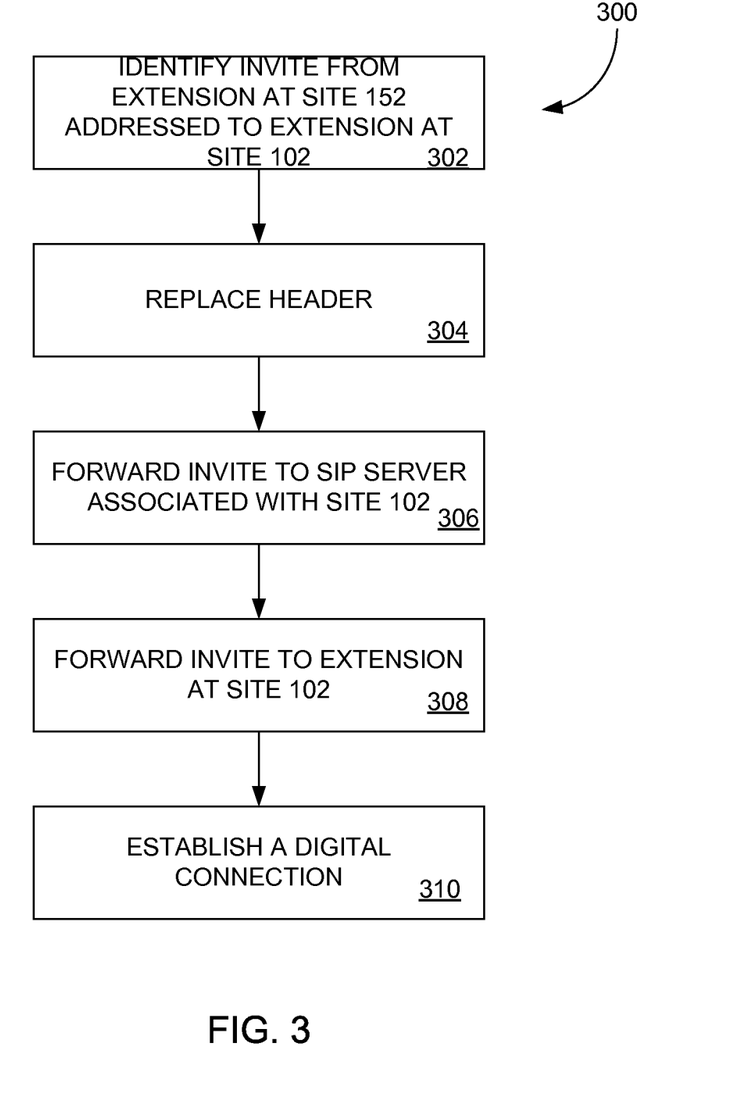
FIG. 3 is a flowchart of a method for establishing a connection pursuant to some embodiments.

Reference is now made to FIG. 3, where a method 300 for establishing a connection between extensions is shown. The method 300 may be performed by, for example, the SIP Server 154 upon receipt of an INVITE request message from an extension associated with the remote call center 152. For example, a user operating station 158 may interact with a keypad of the station 158 to initiate a call transfer or conference call with an extension associated with the back office center 102. The station 158, upon receipt of the command to initiate the call transfer or conference call, generates an INVITE request in accordance with the SIP protocol. The INVITE request is transmitted to the SIP server 154 where the header replacement module 156 of the SIP server 154 identifies the INVITE request as one associated with an extension at back office center 102 (e.g., by performing a look up or other operation).

Processing continues at 304 where the header replacement module 156 at SIP server 154 operates to replace the FROM header of the INVITE request with a replacement FROM address (e.g., to identify the INVITE request as coming from the SIP adapter 108). Processing continues at 306 where the updated INVITE request (with the replaced FROM header) is transmitted to the SIP adapter 108 (via the SIP trunk 120) for routing.

Processing continues at 308 where the SIP adapter 108 forwards the INVITE message to the extension identified in the TO address of the INVITE message. Once the INVITE message (with call data) is received by the appropriate extension at site 102 (and the call is connected), a digital connection between the two extensions (the requesting extension at remote call center 152 and the invited extension at back office center 102) is established.

In this manner, embodiments allow calls to be transferred or routed from an Internet telephony system to a PBX system without loss of call features or data. Calls may be easily and accurately routed, allowing VoIP call center agents to conference and transfer calls to agents or administrators at a legacy PBX-served location.

Figure 5:
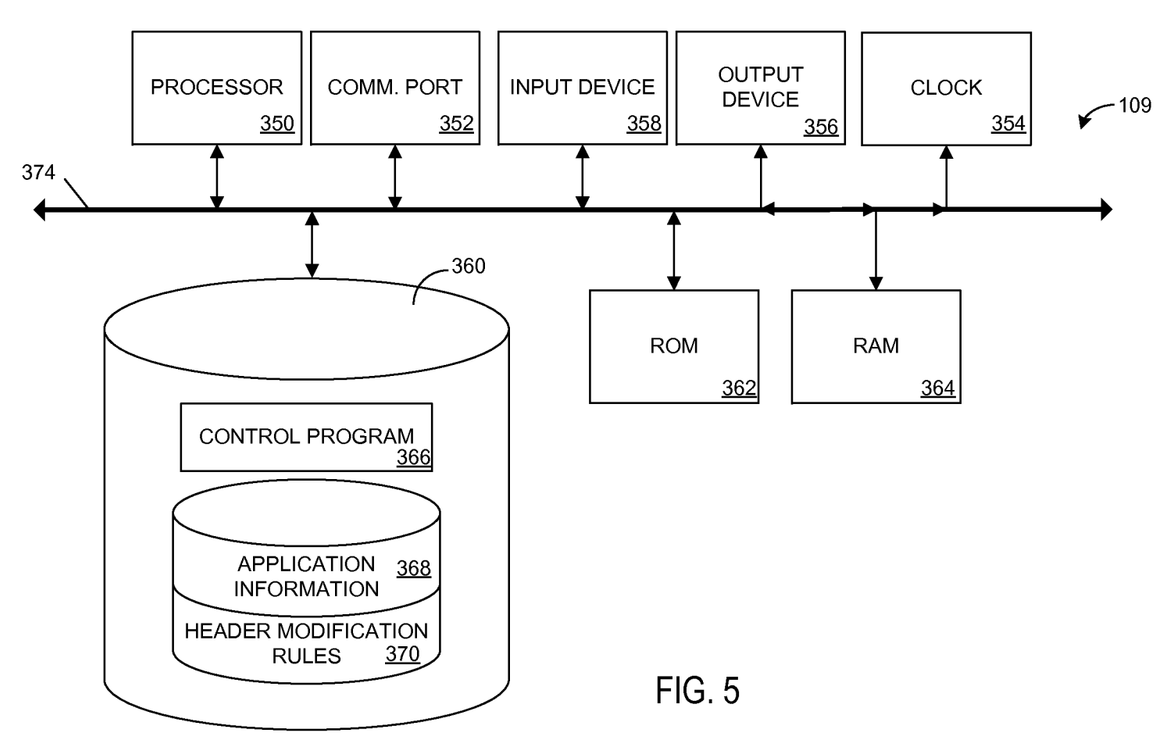
FIG. 5 is a block diagram of a SIP server according to some embodiments.

Now referring to FIG. 5, a representative block diagram of a SIP server 154 is shown. In some embodiments, the server 154 may be adapted to implement one or more of the elements of the methods disclosed herein.

The server 154 may include a processor, microchip, central processing unit, or computer 350 that is in communication with or otherwise uses or includes one or more communication ports 352 for communicating with user devices and/or other devices. In some embodiments, the processor 350 may be operative to implement one or more elements of the methods disclosed herein. Communication ports may include such things as local area network adapters, wireless communication devices, Bluetooth technology, etc. The server 154 also may include an internal clock element 354 to maintain an accurate time and date for the server 154, create time stamps for communications received or sent by the server 154, etc.

If desired, the server 154 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, automatic speech recognition, etc.

In addition to the above, the server 154 may include a memory or data storage device 360 to store information, software, databases, communications, device drivers, applications, etc. The memory or data storage device 360 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 154 also may include separate ROM 362 and RAM 364.

The processor 350 and the data storage device 360 in the server 154 each may be, for example: (i) located entirely within a single computer or other computing device; or (ii) connected to each other by a remote communication medium, such as a serial port cable, telephone line or radio frequency transceiver. In one embodiment, the server 154 may comprise one or more computers that are connected to a remote server computer for maintaining databases.

A conventional personal computer or workstation with sufficient memory and processing capability may be used as the server 154. In one embodiment, the server 154 operates as or includes a Web server for an Internet environment. The server 154 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 350. Equivalent processors are available from Motorola, Inc., AMD, or Sun Microsystems, Inc. The processor 350 also may comprise one or more microprocessors, computers, computer systems, etc.

Software may be resident and operating or operational on the server 154. The software may be stored on the data storage device 360 and may include a control program 366 for operating the server, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The server 154 also may include or store information regarding client devices, alerts, client applications, communications, etc. For example, information regarding one or more applications may be stored in an application information database 368 for use by the server 154 or another device or entity. Information regarding one or more header replacement rules may be stored in header replacement rule database 370 for use by the server 154 or another device or entity. In some embodiments, some or all of one or more of the databases may be stored or mirrored remotely from the server 154.

In some embodiments, the instructions of the control program may be read into a main memory from another computer-readable medium, such as from the ROM 362 to the RAM 364. Execution of sequences of the instructions in the control program causes the processor 350 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 374.

While specific implementations and hardware configurations for servers 154 have been illustrated, it should be noted that other implementations and hardware configurations are possible and that no specific implementation or hardware configuration is needed. Thus, not all of the components illustrated in FIG. 5 may be needed for a server implementing the methods disclosed herein. Therefore, many different types of implementations or hardware configurations can be used in the system 100 and the methods disclosed herein are not limited to any specific hardware configuration.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the embodiments and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Applicant has found that embodiments of the present invention can be used with desirable results in call centers operating in regulated industries such as the insurance industry. For example, such industries often require frequent and efficient interaction between front line agents or sales representatives (e.g., at a remote call center such as center 152 of FIG. 1) and back office supervisors or underwriters (e.g., at a back office center such as center 102 of FIG. 1). As an example, in many insurance sales calls, a customer or potential customer may initially interact with an agent at a remote call center 152. Once a policy quote or decision needs to be made, however, an underwriter (typically at a back office center 102) must be brought into the call to complete the quoting or underwriting decision. Embodiments allow an agent at a remote call center 152 to easily and efficiently invite an agent or representative at a back office center 102 to participate in an ongoing call, despite the different technologies at the two centers.

Further, many such regulated industries have voice mail policies which require regular (such as daily) back up of voice mail messages to comply with document retention policies. Embodiments of the present invention allow a primary voicemail system (such as system 110 of FIG. 1) at a consolidated back office center 102 to be used to record and store all voice mail messages, even those for one or more remote centers 152. In this way, only a single backup of all voice mails (across multiple centers) need be performed.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A communications server associated with a first call center, comprising:
   a communication device to receive call request messages from a plurality of call stations;
   a processor coupled to the communication device; and
   a storage device in communication with said processor and storing instructions adapted to be executed by said processor to:
      for each of the call request messages, identify header data identifying a requesting extension and an invited extension, the invited extension associated with a second communication server at a second call center;
      replace said header data identifying a requesting extension with proxy data for said requesting extension; and
      forward, to said second communication server, said call request including said header data identifying the invited extension and said proxy data for said requesting extension.

2. The communication server of claim 1, further storing instructions adapted to be executed by said processor to:
   establish a connection between said requesting extension and said invited extension.

3. The communication server of claim 1, wherein said communication server is a voice over internet protocol (VOIP) server.

4. The communication server of claim 1, wherein said second communication server is a private branch exchange (PBX).

5. The communication server of claim 4, further storing instructions adapted to be executed by said processor to:
   establish a connection between said requesting extension and said invited extension; wherein said PBX is coupled to a VOIP adapter, and wherein said connection is between said VOIP adapter and said first communications server.

6. The communication server of claim 1, wherein said call request messages are Session Initiation Protocol ("SIP") messages.

7. The communication server of claim 1, wherein the replacement of said header data identifying a requesting extension with proxy data for said requesting extension is performed at a VOIP server associated with said requesting extension.

8. The communication server of claim 7, wherein said proxy data for said requesting extension is an address of a VOIP adapter associated with said second communication server.

9. The communication server of claim 1, further storing instructions adapted to be executed by said processor to:
   identify said call request message as a type of message for which a replacement header is required.

10. The communication server of claim 9, further storing instructions adapted to be executed by said processor to:
    determine said proxy data for said requesting extension by performing a look up of said requesting extension.

11. The communication server of claim 1, wherein said requesting extension is associated with an insurance sales representative and said invited extension is associated with an insurance underwriter.

12. A method for routing call data within a network, comprising:
    receiving a call request at a first server, the call request including header data identifying a requesting extension and an invited extension, the invited extension associated with a second server;
    replacing said header data identifying a requesting extension with proxy data for said requesting extension; and
    forwarding said call request including header data identifying the invited extension and said proxy data for said requesting extension to a second server.

13. The method of claim 12, further comprising:
establishing a connection between said requesting extension and said invited extension.

14. The method of claim 12, wherein said first server is a voice over internet protocol (VOIP) server.

15. The method of claim 12, wherein said second server is a private branch exchange (PBX).

16. The method of claim 15, further comprising establishing a connection between said requesting extension and said invited extension, and wherein said PBX is coupled to a VOIP adapter, and wherein said connection is between said VOIP adapter and said first server.

17. The method of claim 12, wherein said call request is a Session Initiation Protocol ("SIP") message.

18. The method of claim 12, wherein said replacing said header data identifying a requesting extension with proxy data for said requesting extension is performed at a VOIP server associated with said requesting extension.

19. The method of claim 18, wherein said proxy data for said requesting extension is an address of a VOIP adapter associated with said second server.

20. An insurance call center system, comprising:
a first call center having a first communications server in communication with a plurality of agent stations;
a second call center having a second communications server in communication with a plurality of administrator stations;
operating the first communications server to
receive a call request message from one of said agent stations, the call request message having header data identifying a requesting extension and an invited extension, the requesting extension associated with one of said agent stations and the invited extension associated with one of said administrator stations;
replace said header data identifying a requesting extension with proxy data for said requesting extension; and
forward, to said second communication server, said call request including said header data identifying the invited extension and said proxy data for said requesting extension.

* * * * *